United States Patent
Smith et al.

(10) Patent No.: US 12,443,967 B2
(45) Date of Patent: Oct. 14, 2025

(54) APPARATUS AND METHODS FOR HIGH-ORDER SYSTEM GROWTH MODELING

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/414,835

(22) Filed: Jan. 17, 2024

(65) Prior Publication Data
US 2025/0232320 A1     Jul. 17, 2025

(51) Int. Cl.
*G06Q 30/0201*     (2023.01)
(52) U.S. Cl.
CPC ............... *G06Q 30/0201* (2013.01)
(58) Field of Classification Search
CPC ................................................ G06Q 30/0201
See application file for complete search history.

(56) References Cited

U.S. PATENT DOCUMENTS

| | | |
|---|---|---|
| 2014/0207527 A1 | 7/2014 | Garvey |
| 2018/0060744 A1* | 3/2018 | Achin ............ G06N 20/00 |
| 2021/0264520 A1* | 8/2021 | Cummings ........... G06Q 40/12 |
| 2021/0279629 A1 | 9/2021 | Nelson |
| 2022/0132748 A1* | 5/2022 | Vild ........... G16B 25/10 47/1.7 |
| 2022/0245557 A1 | 8/2022 | Minter |

FOREIGN PATENT DOCUMENTS

| | | | | |
|---|---|---|---|---|
| CN | 113344282 A | * | 9/2021 | ........... G06Q 10/103 |
| CN | 114092680 A | * | 2/2022 | ........... G06F 18/2431 |
| CN | 116975625 A | * | 10/2023 | ........... G06F 18/214 |
| EP | 4116403 A1 | * | 1/2023 | ........... C12M 41/48 |
| WO | WO 2022150357 A1 | * | 7/2022 | ........... G06F 16/256 |

* cited by examiner

*Primary Examiner* — Rehana Perveen
*Assistant Examiner* — John David Hagler
(74) *Attorney, Agent, or Firm* — Caldwell Intellectual Property Law

(57) ABSTRACT

An apparatus and method for high-order modeling of a system is disclosed. The apparatus comprises at least a computing device to receive a plurality of system data, determine at least a current rate of growth for a plurality of categories of system data, generate at least a second-order model of the projected growth, identify at least a decrease in the second-order model for projected growth, identify a pattern associating the decrease in the second-order model to at least a single system datum, and configure a remote display to export a summary of the identified decrease in second-order model, identified pattern, and the recommended user actions to optimize the system growth rate. The method comprises a machine-learning model to execute the process described above.

18 Claims, 6 Drawing Sheets

APPARATUS AND METHODS FOR HIGH-ORDER SYSTEM GROWTH MODELING

FIELD OF THE INVENTION

The present invention generally relates to the field of artificial intelligence. In particular, the present invention is directed to an apparatus and methods for high-order system growth modeling.

BACKGROUND

Efforts to model complex system growth sufficiently to base forward-looking optimization decisions have failed to adequately capture the input factors and weighting schemes appropriate for real world impact analysis. Growth-based decisions are commonly determined by a committee vote or by empowered individuals, but almost always rely primarily on instinct and gut determination of humans. In best cases, an informed spreadsheet may be used to incorporate user-defined weights to varying criteria, with some degree of dependence on past estimations or data. Even these informed spreadsheets are glorified calculators with no ability to modify structure and weighting over time, especially to withstand employee turnover and tribal knowledge. This type of reliance on erred human approximation leads to significant time and economic losses, which thus far, have been unavoidable. Prior programmatic attempts to resolve this issue have suffered from inadequate user-provided data intake and processing capabilities.

SUMMARY OF THE DISCLOSURE

In an aspect, an apparatus for modeling high-order system growth includes a computing device configured to receive system data, determine a current rate of growth based on the user's defined system attributes, generate a second-order model of projected growth based on the current rate of growth, and identify any decreases in the second-order model associated with any of the populated categories of system data. The computing device also identifies any patterns associated with each of the populated categories of system data based on causal associations with the second-order model. Finally, the computing device configures a remote display of the model and displays the second-order model and the identified patterns for the user.

In another aspect, a method for high-order system growth modeling includes receiving, by a computing device, a plurality of system data describing a system, determining at least a current rate of growth according to at least one category of the plurality of system data, generating at least a second-order model of projected growth corresponding to the at least a current rate of growth, and identifying a decrease and a pattern of data. The decrease includes identifying a reduction in the second-order model for each category of system data. Identifying a pattern includes recognizing any data causally associated with the decrease in second-order model. The method also includes configuring, by the computing device, a remote device used to generate a display to the user of the decrease and pattern associated with the second-order model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
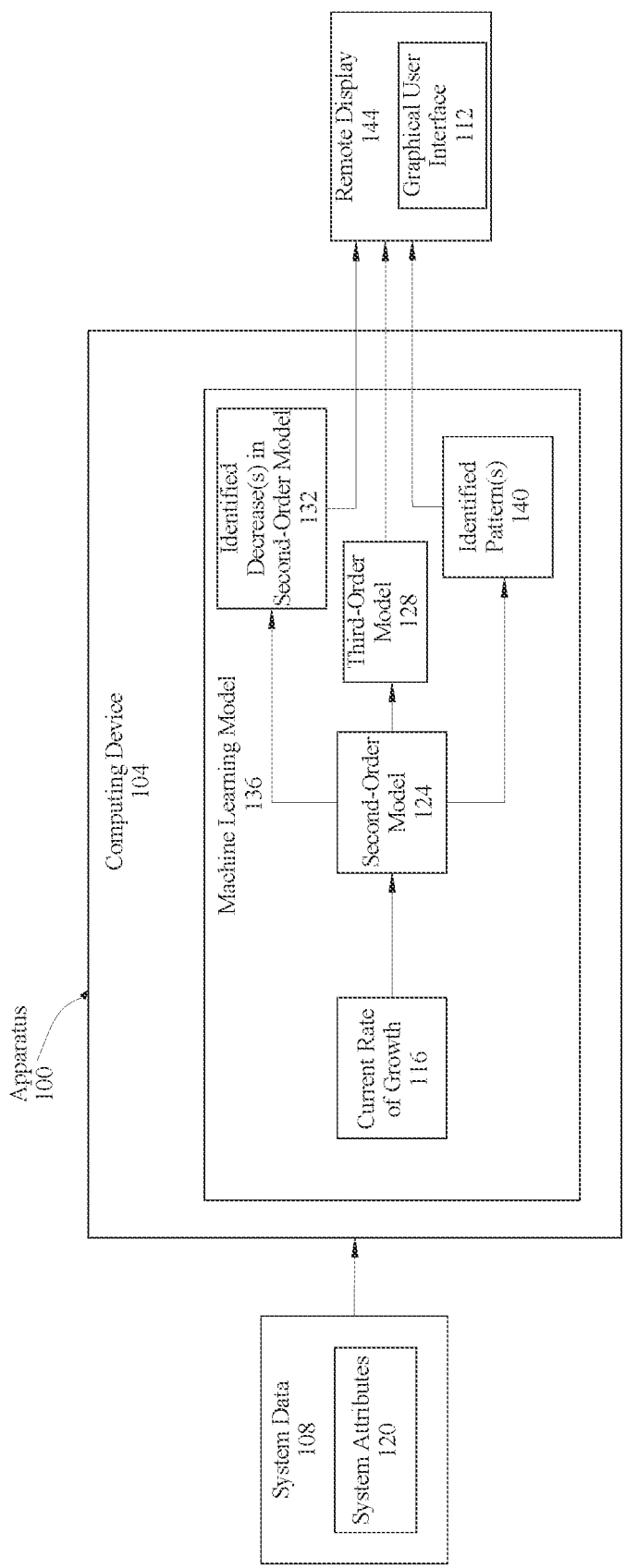
FIG. 1 is a block diagram of an exemplary embodiment of an apparatus for high-order system growth modeling.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus, and a method for high-order system modeling. An accurate and reliable ability to characterize and decide based upon a set of poorly quantified attributes of a system has thus far been unavailable. Without the ability to simultaneously assess the multitude of input variables that define common working problems, workplace entities are left to make impactful, costly decisions based on under-informed techniques. A high-order system model enables users to effectively capture the bases for their decision and rely on a machine-learning model to augment their selection of the best resolution alternative. Human decision-making is a fallible process too reliant on emotions and biases, and too inept to calculate multiple orders of a complex multi-factored growth system in real-time. Therefore, the high-order system model provides an improvement in the current operational decision making calculations.

Aspects of the present disclosure can be used to aid a user in their complex decision-making efforts. User identifies and categorizes, or relies on the machine-learning model to categorize, the factors the decision relies upon. From there, a machine-learning model relying on its aggregated data and historical decision analyses is able to augment user's decision based on its generation of an exhaustive growth formula. Aspects of the present disclosure can also be used to mitigate, or wholly circumvent barriers or obstacles to growth. Each identified impediment may be recapitulated within the high-order system model to ensure the optimal response is affected. This is so, at least in part, because the high-order system model is able to approximate both the current rate of growth as well as a projected future rate of growth by quantifying the changes in the system over time based on the user-defined system data.

Additionally, high-order system modeling to capture impediments and improve operational efficiency may be implemented at any stage of growth. An individual, private business, corporation, or any other institution may engage the high-order system modeling as disclosed herein to improve quality, speed, cost, or any other attribute the user intends to optimize. Specifically, the disclosed method and apparatus may be exercised in the early stages of development, where the user may be focused on new clients or revenue streams, or in the mature, refined phase where a user aims to fully optimize a system and wring out all potential opportunity and gains available. High-order system modeling may be used to grow into the next stage by identifying impediments and augmenting the user's decision-making process to remove or mitigate the identified impediments. Stages of growth may be characterized as two or more stages; as a non-limiting example, stages of growth may include six stages of growth or more. Stages may pertain to increases in unique capabilities, increases in teamwork and/or technology relating to national and/or global reach, increases in freedoms of money, time, relationships, and/or purpose, movement toward allocation of tasks to particularly capable personnel, continual growth in clientele, and/or continual growth in revenue.

Referring now to FIG. 1, an exemplary embodiment of an apparatus 100 for high-order system growth modeling. Apparatus includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing devices, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 1, computing device 104 is configured to receive a plurality of system data 108, which describes a system. As used in this disclosure, "system data" is data describing a system. As used in this disclosure, a "system" is a physical phenomenon, process, or collection of phenomena and/or processes that has measurable inputs and outputs and an internal state, which may or may not be directly measurable. An example of a system is a social media network that consumes user data to share with peer users. Another example of a system is a car stereo that accepts user selections to direct a specific audio source and characteristics to output to the vehicle's stereo system. As a separate example, a system may be a business entity. A business entity may include an entity engaged in developing and delivering software as a service (SaaS), wherein the entity is interested in improved tracking and improving its delivery methods and timelines for its customer base. System data 108 may include a plurality of characteristics of a mission or goal. These characteristics may include quantifiable metrics describing the current state, the final state, and the process necessary to achieve the final state along with any quantifiable obstacles or catalysts along that trajectory. In some embodiments, receiving the plurality of system data 108 may include receiving the plurality of system data 108 from a user interface. For the purposes of this disclosure, a "user interface" is a means by which a user and a computer apparatus interact; for example, through the use of input devices and software. A user interface may include graphical user interface, command line interface (CLI), menu-driven user interface, touch user interface, voice user interface (VUI), form-based user interface, any combination thereof and the like. In some embodiments, user may interact with the user interface using a computing device distinct from and communicatively connected to computing device 104.

For example, a smart phone, smart tablet, or laptop operated by user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 112 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when user performs a specific action. An example of this is pressing the right mouse button. When this is done, a menu may appear under the cursor. Files, programs, web pages and the like may be represented using a small picture in a graphical user interface. In other embodiments, the receipt of the plurality of system data 108 may be automated to pull data from a preexisting digital repository with no human intervention. In further embodiments, the receipt of system data 108, at least in part, may be accomplished by the machine-learning model based on its stored historical data from prior system analyses. This historical data may be stored within a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, computing device 104 is configured to determine at least a current rate of growth 116 of system and/or a portion thereof according to at least one category of system data 108. Determining at least a current rate of growth 116 may involve determining the at least a current rate of growth for a plurality of user-defined categories which effectively capture a set of system attributes 120. System attributes 120 may include any relevant quantifiable characteristic as it applies to the selected system. Examples of a relevant quantifiable characteristic include production capacity of an individual or facility, an expected delay caused by a union strike in the supply line, a learning curve timing associated with a new software tool, and/or any other metric-based system attribute. Aforementioned user-defined categories may include a user's attempt to bound and/or characterize input data such that affiliated causes and effects are grouped and calculated jointly. In an embodiment, user-defined categories may include without limitation productivity, profitability, differentiation, innovation, influence, and/or any other appropriate categorization of real or potential growth. In another embodiment apparatus may rely on fuzzy set comparisons index and/or quantify the system data 108. System attributes 120, user-defined categories and their specific effect on the current rate of growth 116 may be amplified or reduced using a prioritization coefficient. A prioritization coefficient may quantify and apply the relative importance between each defined category of system data 108 by assigning a numerical score to each category; for instance, a larger number relative to the prioritization coefficient of other categories, may indicate a more significant impact that category will have on the current rate of growth 116.

Still referring to FIG. 1, current rate of growth 116 is calculated based on user's system data 108 inputs. System data 108 may include a set of variables that contribute to a definable equation or approximation. Current rate of growth 116 may then reveal a negative growth, meaning the business is reducing its output, or other comparable defined goal. In a non-limiting embodiment, system data 104 may include an annual goal of selling 1,000 vehicles by the end of the year. System data 108 would further include all of the quantifiable factors upon which reaching the annual goal depends. For example, system data 108 may include delivery of the raw sheet metal by the beginning of the calendar year, wherein the growth rate is forced to 0 until the sheet metal is delivered to the factory. Further, the factory requires a full complement of factory employees, which is set at 20 employees, wherein every human-day less than the predefined 20 human-days per year decreases the annual production rate by 0.014%, unless the factory management elects to retain a set of standby employees, which would increase the cost per unit of production but may simultaneously raise the net production rate of the factory. Further still, current rate of growth 116 may incorporate a learning curve factor, which enables a slow increasing growth rate based on gained efficiencies over the year. These efficiencies may be sourced from improved employee skill, equipment upgrades, or process improvements, such as shift turnover efficiencies, or reduction in workplace accidents that shut down the factory. Learning curve efficiency gains may only reach a maximum upper limit of productivity, which may be set by user initially, or approximated by machine-learning model 136 based on user's updated system data 108 throughout the work year. These types of quantifiable characteristics enable machine-learning model 136 to plot a complex equation to approximate the overall growth. This equation becomes more accurate and representative as user improves the system data 108 and system attributes 120.

Still referring to FIG. 1, system data 108 may include a first strategy datum, a second strategy datum, and any number of additional strategy datum points to effectively define a system, its goals and its prioritization approach. As used in the current disclosure, a "strategy" is a type of outlook or plan used to assist a user in getting from a starting point to accomplishing a system goal. A strategy may include an efficiency strategy, a human resource strategy, a management strategy, a service strategy, a marketing strategy, a market analysis strategy, and the like. In an embodiment, a first strategy datum may include an efficiency strategy while the second strategy datum comprises a human resource strategy. As used in the current disclosure, an "efficiency strategy" is a plan to achieve an entity goal that focuses on improving the efficiency of internal and external processes. This may include eliminating or altering any unnecessary, time-consuming, or resource-consuming steps within these processes. Efficiency may be compared to similarly situated businesses or processes. Strategy data may indicate if a user needs to add or remove internal/external processes to facilitate the achievement of an entity goal. As a non-limiting example, a "human resource strategy" is a plan to achieve an entity goal centered around human resource issues. This may include an evaluation of the business's employees and the job function of those employees. This may be done by evaluating the output or work product of each employee as compared to their industry peers. As used in the current disclosure, a "service strategy" is a plan to achieve an entity goal centered around an analysis of the products/services provided by the businesses. In an embodiment, a service strategy may include evaluating the market for the given product/service. A service strategy may additionally include an analysis of adjustments to the quality or price point of services/strategies that are offered by the user. In some embodiments, computing device 104 may be configured to compare each strategy datum to identify common themes. Common themes may include common personnel, equipment, timelines, strategy category, personnel traits, and the like. In another non-limiting embodiment, user may intend to optimize a team of software engineers in their approach to delivering a new digital application. User would capture the team's, or if available, each user's historic individual development rates in lines of code per hour. User would then estimate based on similar efforts that this specific digital application should require approximately 3,000,000 lines of code and must be delivered within 6 months. With this data, user would assign at least a first strategy datum, wherein this case may dictate a cost-efficiency priority. When oversimplified to a linear scale, current rate of growth 116 would reflect that the team will need to generate approximately 23,000 lines of code per day. To optimize this system, user may collect historic data from similar evolutions wherein bringing certain senior software engineers on a part time basis actually increased the lines of code per hour production rates, but only up to a maximum of 1,000 lines of code per day. Further, the increase in production rate sees diminishing returns on a logistic growth scale wherein the senior software engineer's contributions are optimally affected by a 3 hour per week contribution, wherein an 8 hour per week contribution still increases productivity, but at a diminished rate. Then any contribution above the 8 hour per week is negligible and inefficient. Machine-learning model 136 may additionally recommend certain team compositions that have been shown to make individuals more productive than their baseline average. User may additionally choose to approximate the initial training and brainstorming phase, which is often unaccounted for and difficult to estimate. Relying on historical data comparisons, user may estimate a one week delayed start to account for plan development and outlining. With this type of data inputs, and an informed machine-learning model 136, computing device 104 may generate a user summary recommending a two week planning and outlining phase, with a 5 hour/week subject matter expert consultation from a senior software engineer. It may further recommend certain personnel teams or task assignments based on prior success or inefficiencies identified in other evolutions. As the system sets out on the programmed endeavors, user may provide regular feedback to ensure up-to-date environmental factors. In a non-limiting example, as the one week planning and outlining phase concludes, user may update system data 108 to reflect the actual time that was necessary, and include any metric-based reasoning that may contribute to a more accurate estimate in subsequent, similar engagements. In this example, retroactive data inputs would not significantly impact the overall growth since the planning phase would be based on independent factors from the actual development. But in most cases, retroactive updates to system data 108 would impact future projections and affect current rate of growth 116, as well as both second-order model 124 and third-order model 128. With machine-learning model's 136 pattern recognition and historical tracking, computing device 104 will continue to grow and refine these approximations to provide more precise, valuable feedback.

Still referring to FIG. 1, computing device 104 is configured to calculate a current rate of growth 116 based on system data 108. Computing device 104 will extrapolate a current rate of growth 116 from at least two system data 108 points. At a minimum system data 108 must include 2 affiliated data points usually separated by time, but may be separated by some other quantifiable metric (e.g. production rate, quality, market sales, etc.). Computing device 104 may assume characteristics where requisite data is missing from system data 108. In a non-limiting embodiment, system data 108 may define a current point wherein no work, planning, or development has commenced, and a final point wherein the system goal is defined as delivering a 3,000,000 lines of code digital application within 12 months. With only this information, computing device 108 may extrapolate a plan breaking down the quantified delivery, in this case the lines of code, over the provided timeframe. With no additional information, computing device 104 may generate a plan to develop 250,000 lines of code per month for the next 12 months. If machine-learning model 136 has historic development rates to rely on, it may generate a recommended number of developers to be assigned to satisfy this development rate. If machine-learning model 136 has historical data to rely upon, it may further recommend more specified recommendations (e.g. specific team assignments, strategizing and planning timing, subject matter expert referrals, etc.). In a separate non-limiting embodiment, system data 108 may characterize a system which initially produces 400 units per month, but aims to increase to 500 units per month as fast as possible. Computing device 104 would again extrapolate a path to increase the production rate as defined, but this time will be required to confine itself to a set resource availability. For instance, if machine-learning model 136 has substantial historical data to rely upon, it may already comprehend the personnel, equipment, safety, administration, and financial limitations within which it must generate its current rate of growth 116. If machine-learning model 136 does not have this type of information, it would likely introduce a plan proposing user starts producing 500 units per month immediately, wherein user would then provide feedback, through GUI, as embodied in FIG. 5, the specific limitations precluding the immediate increase in production. In each of these examples, especially where input data is limited, computing device 104 will be more valuable and accurately predictive when user submits periodic feedback on the generated growth rate and higher-order models. As explained below, a supervised machine-learning process may associate input data, as defined as inputs within this disclosure, to output data, as defined as outputs within this disclosure. This association process occurs based on training data, which in many cases may be provided by user in the form of direct GUI feedback, with this and other methods discussed in detail below.

Still referring to FIG. 1, computing device 104 is configured to generate at least a second-order model 124 of projected growth which corresponds to current rate of growth 116. Second-order model 124 approximates a rate of change in a current rate of growth for analysis into the growth trends over time and based on input changes; second-order model may, for instance, model a slope, first-order differential, or the like of current rate of growth at one point and/or moment or over one or more intervals representing current, past, or future rates of growth. For example, a current rate of growth that has a positive second-order model approximation may be indicative of an upward trending rate of growth, or a positive acceleration; second order model may include and/or generate such a second-order model approximation. In some embodiments, this second-order model may show valuable impacts of specific pieces or changes of system data 108. In another embodiment, computing device 104 may compute a third-order model 128, wherein third-order model 128 may illustrate, model, and/or estimate a rate of change of second-order model. Third-order model 128 approximates a rate of change of a rate of change which may, as a non-limiting example, estimate a concavity of a rate of growth and may be used to further refine an assessment of an effect on environmental conditions of system. Third-order model 128 may be used to update second-order model to more accurately predict a past, present, or future growth rate. Third-order model 128 may further support identifying a local minimum and maximum in the rate of growth 116 to allow user to evaluate any contributing environmental factors associated with the local minimum and maximum.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine-learning software program where the commands to be executed are determined in advance by a user and written in a programming language. As applied in this disclosure, machine-learning process may ingest user-input system data 108 to approximate a current rate of growth 116. Machine-learning process would then derive second-order model 124 which approximates the rate of change of current rate of growth 116. This rate of change displays the positive or negative impact of environmental changes in near real-time such that user may respond and adjust as necessary to mitigate inhibiting inputs and maximize positive inputs. As an example, continuing with the vehicle production line example from above, user may update a raw material delivery date to 2 weeks later than originally planned, but still 1 week prior to factory line implementation, so the team may superficially assess a marginal impact. If modeled effectively by current rate of growth 116, second-order model 124 may display the severe implications as shown by a sharp decrease in second-order model 124, leading user to recognize the delay in usable raw materials by a two week inspection and processing time. This impact may be more readily identified by third-order model 128 which would show the rapid decrease in second-order model 124 as a steep negative profile which would be immediately flagged by computing device 104 for user attention. If not immediately identified based on inadequate system data 108 to model the aforementioned delay, machine-learning model 136 would retroactively identify the audit and processing delay to apply to future similar scenarios. In a non-limiting example, growth modeling as described within this disclosure may be the same or substantially the same as the higher-order growth modeling described in U.S. patent application Ser. No. 18/141,725, filed on May 1, 2023, titled "APPARATUS AND A METHOD FOR HIGHER-ORDER GROWTH MODELING," which is incorporated by reference herein in its entirety.

Still referring to FIG. 1, computing device 104 is configured to identify at least a decrease in second-order model 124 associated with each category, as applicable. This identified decrease 132 may be accomplished by a machine-learning model 136 which simulates each rate of growth 116 and second-order model 124 immediately before and after each change in user-defined inputs. Computing device 104 may then compare rate of growth 116 and second-order model 124 prior to a change with rate of growth 116 and second-order model 124 subsequent to the change to generate a summary for feedback for user. In an embodiment, comparison and calculation may be accomplished through machine-learning model's 136 use of real-time continual analysis to evaluate a rate of growth as it changes over time and based on any changed inputs from user or another device. In another embodiment, comparison and calculation may be accomplished through the machine-learning model's 136 use of comprehensive, hypothetical environmental characteristics to generate a set of optional resolutions with associated probabilities of success. In a non-limiting embodiment based on the aforementioned example of a software development team, user may define a software interface development effort. User may further bound the minimums and maximums for each operational factor. For example, while a computer alone may assess that assigning three thousand software engineers will enable a rapid resolution, user may bound the maximum number of software engineers available at any time as twenty-five. With this constraint, machine-learning model 136 would confine its recommendations to no more than twenty-five concurrent software engineers, and promote the next most viable option for any further required growth rate enhancements. Additionally, machine-learning model 136 may rely on training data to inform and enhance its comparison and calculation methods. In an embodiment, training data may include hindsight user data at the conclusion of each growth model's application covering the actions taken, environmental effects of those actions, and a retroactive evaluation by the user assessing the recommendations generated and their effectiveness. Specifically, as an example, training data may include the association of a downturn in second-order model 124 which was caused by a factory line work injury. Machine-learning model 136 may recognize this has been the cause of several recent second-order model 124 approximations across multiple systems within the same user profile and assess that these types of accidents contribute to an annual loss of 40 workdays per year. While this information alone supports generating valuable feedback for the user, machine-learning model 136 may further make recommendations around training or process improvements to avoid these types of injuries if machine-learning model 136 has success data from other engagements it can apply to the system at issue. This analysis may support machine-learning model's 136 generation of continuously improving recommendations for most constructive user actions. In a separate non-limiting example, training data may include a system data 108 update (i.e. new equipment, hired personnel, process change, etc.) with the immediate change in second-order model 124, whether positive or negative.

Still referring to FIG. 1, computing device 104 is configured to identify a pattern of data 140 causally associated with a decrease in second-order model 132 for each category of system data 108. This pattern identification may be accomplished, without limitation, using machine-learning model 136 that outputs a quantifiable environmental change approximated and/or represented by system data 108 based on a change in growth rate 116 and second-order model 124. Pattern recognition process may include, without limitation, a layered approach wherein change(s) to current rate of growth 116 and second-order model 124 may be time-correlated to a user change. Machine-learning model 136 may further analyze combinations of user inputs and correlate a plurality of effected responses to most accurately capture the causality and relationships within the system. This type of association is explained in detail below in reference to machine-learning process training data, and specifically the supervised machine-learning explanation, wherein correlation of inputs to outputs may include a scoring function based on the closeness of the relationship and applicability as assessed in comparison to historic examples. In some embodiments, pattern identification may rely on a dissociation protocol wherein changes in input system data 108 that do not affect all or part of the current rate of growth or second-order model may be segregated from those parts that were not affected. Similarly, changes in a growth rate and/or second-order model that occur when certain input system data did not change, may be dissociated. Upon dissociation protocol execution, the machine-learning model 136 may be left with correlated associations of user system data 108 inputs with system response characteristics that may be used to inform the pattern identification.

Still referring to FIG. 1, computing device 104 is configured to use a remote display 144 to generate a display as a function of the decrease in each second-order model 132 and each identified pattern of data 140. Remote display 144 may further generate a set of recommendations to user based on its identification of the most constructive action available to improve the rate of growth as well as the dissociation protocol reasoning supporting the action. These constructive actions and dissociation protocol reasonings would be generated by the machine-learning model 136 and based on its pattern recognition and simulated growth calculations. Remote display 144 may be a GUI 112 also capable of accepting user inputs. In some embodiments, remote display 144 may accept retroactive system data upon the full resolution of the system, such that the machine-learning model may ingest the system conclusion characteristics to inform the model's historical repository and growth to better assist future system analyses. In another embodiment, remote display 144 may enable GUI 112 to allow user to fully interpret and query the generated results and their affiliated supporting reasoning.

Still referring to FIG. 1, GUI 112 may include a plurality of event handlers. As used in this disclosure, an "event handler graphic" is a graphical element with which a user of remote device may interact to enter data, for instance and without limitation for a search query or the like as described in further detail below. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to apparatus 100. In some embodiments, event handler may be associated with a service identifier. As used in this disclosure, a "service identifier" is a graphical indication of a service accessible based on a user's access. In some embodiments, a portion of service identifiers may be selectively available to users of particular membership tier.

In an embodiment, and continuing to refer to FIG. 1, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on computing device 104; for instance, data may be saved wholly or in part as a "cookie" which may include data or an identification of remote device to prompt provision of cross-session state variable by apparatus 100, which may store the data on apparatus 100. Alternatively, or additionally, apparatus 100 may use login credentials, device identifier, and/or device fingerprint data to retrieve cross-session state variable, which apparatus 100 may transmit to remote device. Cross-session state variable may include at least a prior session datum. A "prior session datum" may include any element of data that may be stored in a cross-session state variable. Event handler graphic may be further configured to display the at least a prior session datum, for instance and without limitation auto-populating user query data from previous sessions.

Continuing to refer to FIG. 1, computing device 104 may be used to shift an entity's efforts from a state of complexity, into a state of mastery by continually removing identified barriers and improving system operational efficiency. This may be accomplished by updating system attributes 120 with current information and providing feedback through GUI 112 such that machine-learning model 136 may learn from environmental changes and improve both second-order model 124 and third-order model 128. These improvements may aid a user in user's pursuit of an entrepreneurial mastery by enabling through its identification and recommendation of multiplier actions.

Figure 2:
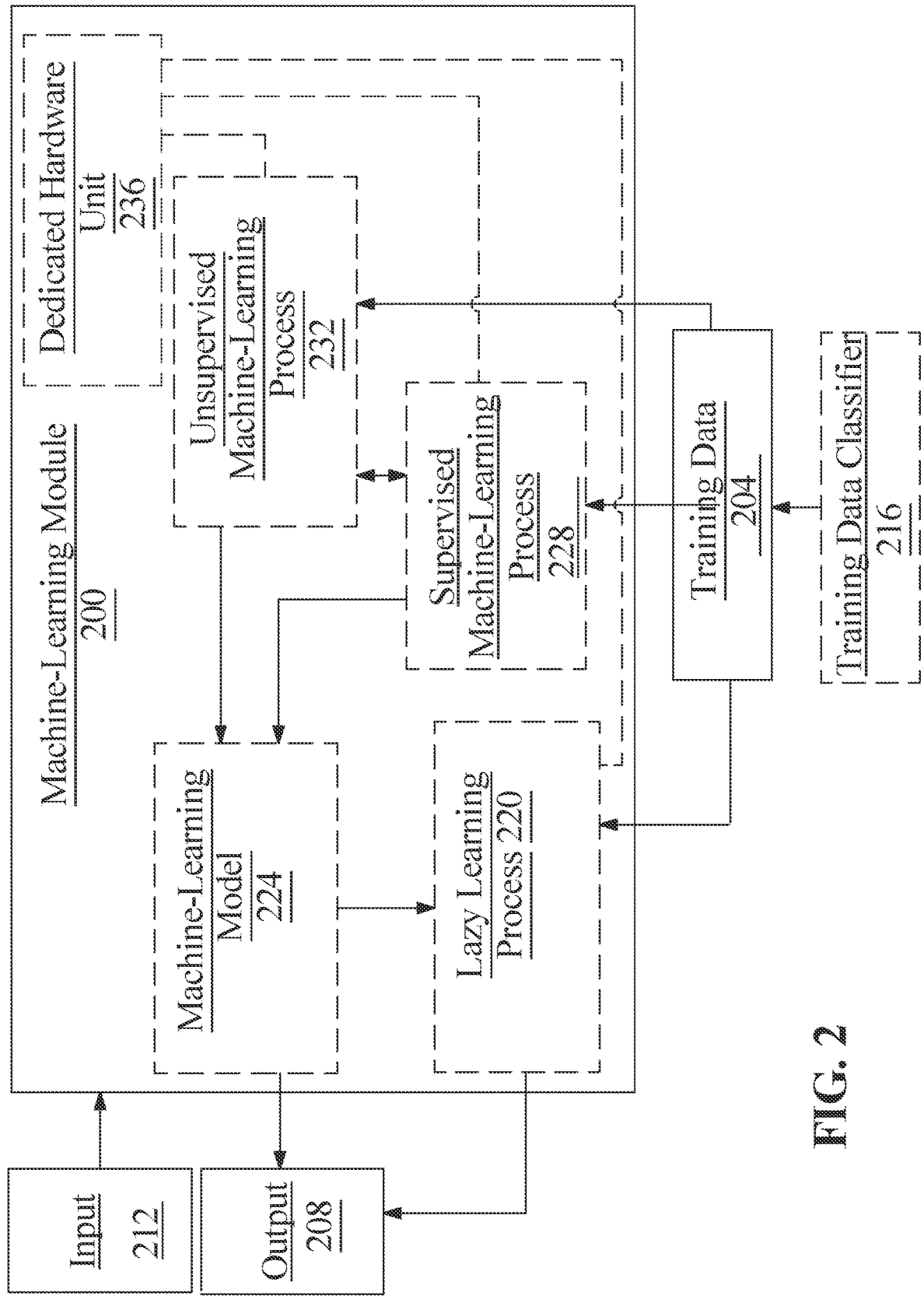
FIG. 2 is a block diagram of a machine-learning module according to an embodiment of the invention.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine-learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to production value, supervisory authority, human resources, workforce allocation, building and material, travel, advertisements, or any other categorization grouping user deems appropriate for the system being analyzed.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, includes algorithms that receive a training set relating a set of inputs to a set of outputs, and seeks to generate one or more data structures representing and/or instantiating one or more mathematical relations correlating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of numerous possible variations of at least a supervised machine-learning process 228 that may be used to determine the relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine-learning processes may include at least an unsupervised machine-learning process 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
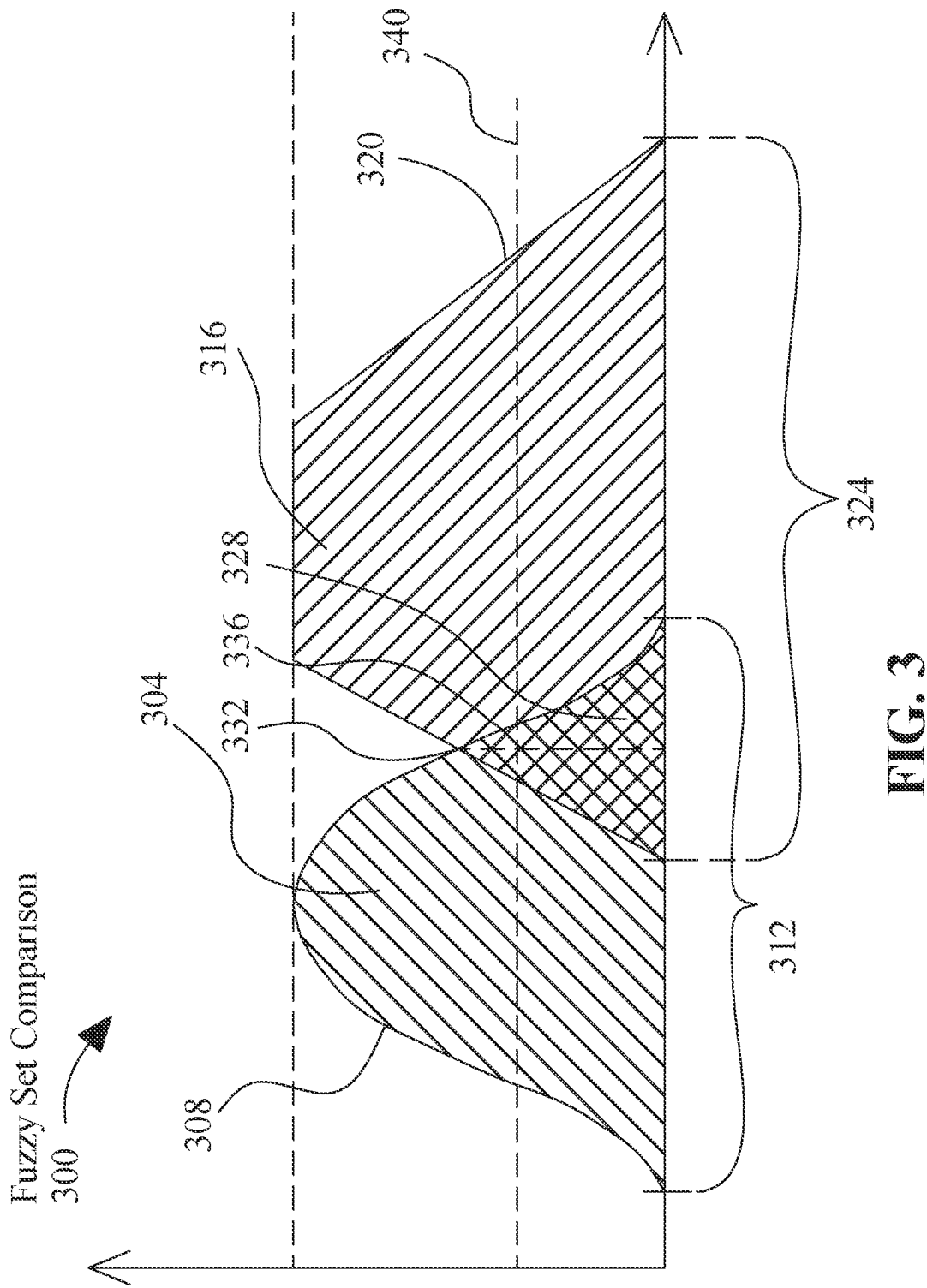
FIG. 3 is an exemplary embodiment of a fuzzy set comparison.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where first membership function 308 has values on a range of probabilities such as without limitation the interval [0,1], and an area beneath first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models, a predetermined class, such as without limitation a user state (e.g., attentive, inattentive, and the like). A second fuzzy set 316, which may represent any value which may be represented by first fuzzy set 304, may be defined by a second membership function 320 on a second range 324; second range 324 may be identical and/or overlap with first range 312 and/or may be combined with first range 312 via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or a biofeedback signal and a predetermined class, such as without limitation a user state, for combination to occur as described above. Alternatively or additionally, each threshold may be tuned by a machine-learning process.

Figure 4:
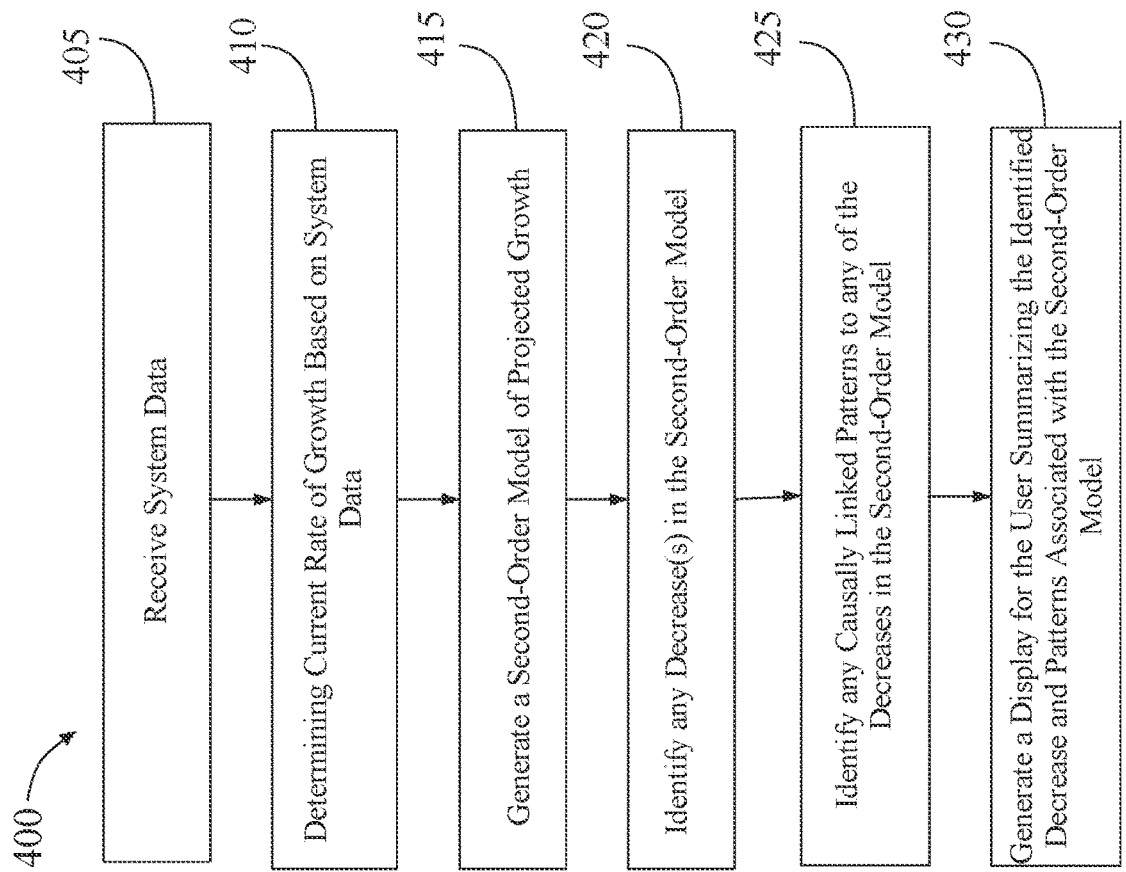
FIG. 4 is a flow diagram of the internal operations of a computing system implementing a high-order system growth model.

Referring now to FIG. 4, an exemplary embodiment of a method 400 for the generation of a high-order growth model is illustrated. At step 405, a computing device receives a plurality of system data. This may be implemented as described and with reference to FIGS. 1-6. In some embodiments, plurality of system data may include a plurality of user-defined categories, and a plurality of optional input groups. In another embodiment, user may populate a set of predefined categories of system data. In another embodiment, machine-learning algorithm may define the categorization of data as it deems most fit. Machine-learning model may further populate the system data from stored inputs used in other system analyses or from its historical data repository. As a non-limiting illustrative example, system data may include descriptors of a system which may further be organized by categories or optional groups, such as a raw material fulfillment which takes eight days to deliver a source product and has maximum single-order quantities of x lbs/week. Further, the process to refine the raw materials into a final deliverable product may take 4 human-hours for each individual product. This process may be further constrained by available human workers, or financial resources, both of which could be quantified in terms of time or money and incorporated into a comprehensive formula. This set of input data may fall into a production category, while a separate overhead category may quantify the cost rates, fluctuations, and value associated with the human resources or financial team. Based on these sample inputs, a reasonable output would be a recommendation as to what quantity of raw material should be ordered and at what rate such that any delays could be mitigated or altogether avoided in the future. Additional sample outputs could recommend reducing certain types of human resource personnel whose contribution does not directly contribute to the identified mission. In some embodiments, receipt of plurality of system data may be affected through a graphical user interface. In other embodiments, system data may be received by an automated injection of data through a connected spreadsheet or other data repository such that machine-learning model may be able to identify and retrieve pertinent data without user's manual selection.

Still referring to FIG. 4, at step 410, computing device determines a current rate of growth based on the system data. This may be implemented as described and with reference to FIGS. 1-6. In an embodiment, method 400 will rely on the machine-learning model to approximate a start point, a finish point, and a rate of progress between the two points all based on the plurality of system data selected. In some embodiments, this calculation will apply quantifiable ratings and prioritizations to the plurality of user-defined system data, whether imposed by the machine-learning model or directly by user, to create a graphical approximation of the growth rate in the form of a polynomial equation. The machine-learning model may support an infinite number of user-defined categories, optional input groups, and instances of quantifiable factors within each category or group. In some embodiments, the current rate of growth may be refined by use of a prioritization coefficient to either amplify or reduce the assessed impact of each category of user data. In this embodiment, the rate of growth would be altered based on the relative differences between the prioritization coefficients for each category of data. This prioritization allows user to manipulate the machine-learning model's calculations to accurately reflect the preferences of user.

Still referring to FIG. 4, at step 415, method 400 includes generating, using the computing device, a second-order model of projected growth. This may be implemented as described and with reference to FIGS. 1-6. In an embodiment, method 400 relies on the machine-learning model to calculate the slope at a designated point of the growth rate. This point will usually be the current growth rate, but user may also interrogate past or future growth rates for a second-order model projection. In another embodiment, the machine-learning model may derive the second-order model using Newtonian Calculus as applied to the polynomial growth rate equation. In most embodiments, the second-order model would be derived with respect to the user-defined economic impact.

Still referring to FIG. 4, at step 420, method 400 includes identifying, using the computing device, any decrease in the second-order model for each category of system data. This may be implemented as described and with reference to FIGS. 1-6. In an embodiment, method 400 relies on the machine-learning model to conduct a continual analysis on the second-order model of projected growth to identify any changes in the second-order model based on new or updated inputs. In another embodiment, the machine-learning model may rely on simulating the environmental impact by applying a comprehensive set of hypothetical inputs into the current rate of growth and the second-order model to compare the outcomes. Based on this set of pre-change and post-change hypothetical outcomes, the machine-learning model may generate a summary of the simulated outputs to support a recommended action for user to optimize the system.

Still referring to FIG. 4, at step 425, method 400 includes identifying, using the computing device, any causally linked patterns in relation to changes in the second-order model for each category of system data. This may be implemented as described and with reference to FIGS. 1-6. In an embodiment, method 400 relies on the machine-learning model to quantify the actual environmental factors and identify a dissociation protocol to dissociate the plurality of environmental factors from the identified change in the second-order model. With the change in second-order model isolated to the causing environmental factor, the machine-learning model may aggregate the economic implications of the current system with other analyzed systems in its history to improve its recommendations to user.

Still referring to FIG. 4, at step 430, method 400 includes generating a display, using the computing device, to summarize the identified decrease and pattern associated with each category of the second-order model. This may be implemented as described and with reference to FIGS. 1-6. In an embodiment, method 400 relies on the machine-learning model to rank the system data based on its effect on the rate of growth. Once isolated, the machine-learning model may then summarize the most constructive action available to optimize the rate of growth based on the user-defined prioritization and factoring. In another embodiment, the machine-learning model may generate and display all available options to improve the current rate of growth. The machine-learning model may rank the available options by their effect on the growth rate, or it may order them based on some other user-identified output structure. In an embodiment, each proposed action may be accompanied by an option for user to interrogate the supporting reasoning for the action. The display may show user the entire logic chain and reasoning leading to the proposed action. In another embodiment, the machine-learning model may generate a display summarizing the most negative actions user could take to deter user from taking those actions.

Figure 5:
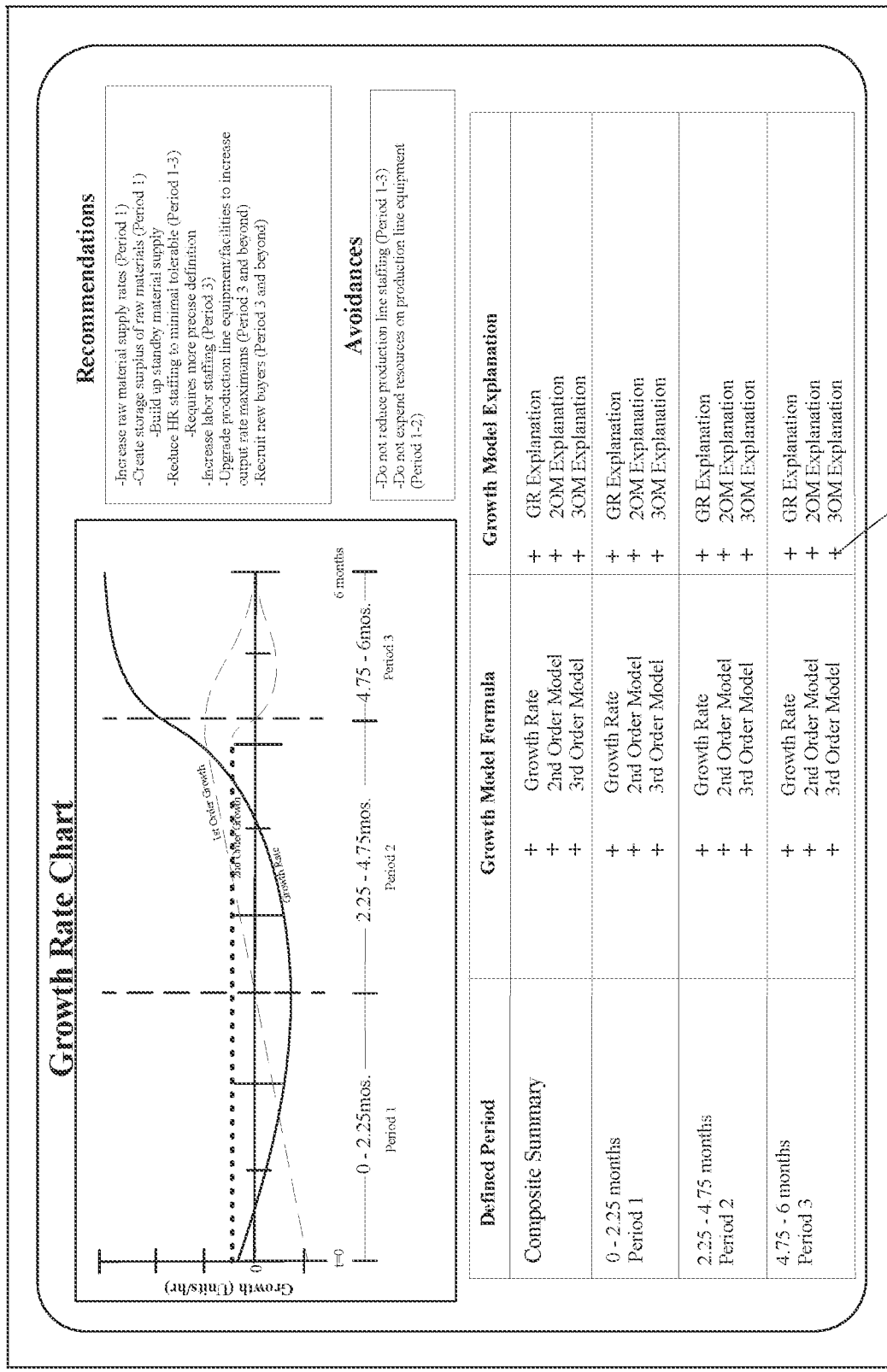
FIG. 5 is an exemplary embodiment of a user interface.

An exemplary embodiment of remote display 132, including GUI 112 is shown in FIG. 5. As described above, remote display 132 may include a feedback screen summarizing the apparatus' evaluation of user inputs including current rate of growth 108, second-order model 120, a third-order model, and recommended actions. Remote display 132 would also provide menu options for user to input new data or update currently applied input data. Remote display 132 may further provide user feedback selections to enable the machine-learning model 136 to improve and correct any particular display mechanism or feedback.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
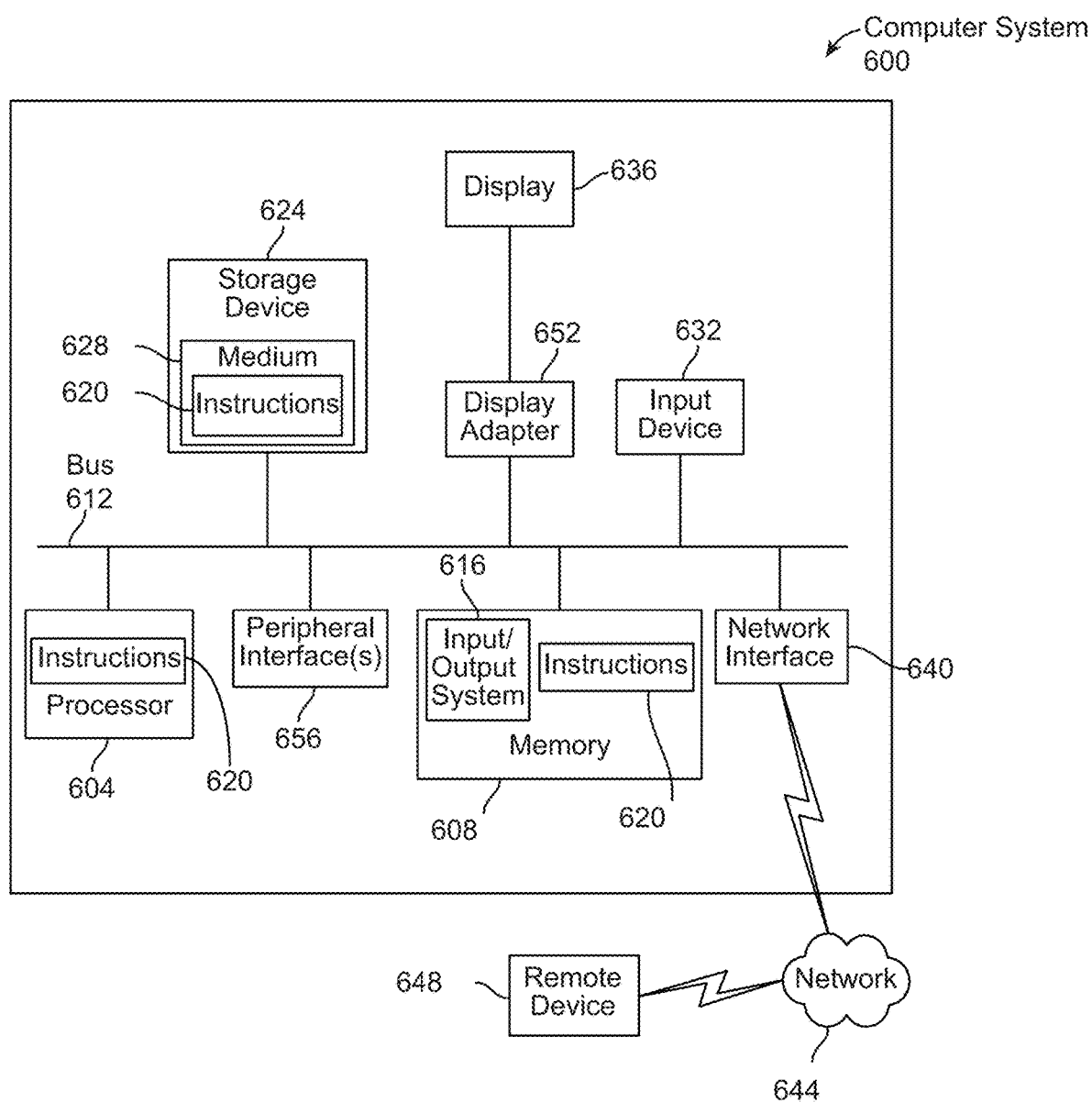
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software instructions 620 may reside, completely or partially, within machine-readable medium 628. In another example, software instructions 620 may reside, completely or partially, within processor 604.

Computer system 600 may also include an input device 632. In one example, a user of computer system 600 may enter commands and/or other information into computer system 600 via input device 632. Examples of input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from a display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to execute the high-order growth model according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for high-order system growth modeling, wherein the apparatus comprises: a computing device configured to: receive a plurality of system data describing a system; determine at least a current rate of growth according to at least one category of system data; generate at least a second-order model of projected growth, wherein each second-order model of the at least a second-order model corresponds to a current rate of growth of the at least a current rate of growth; receive training data, wherein the training data comprises a plurality of data entries containing a plurality of environmental factor data correlated to a plurality of user summary data; sanitize the training data using a dedicated hardware unit comprising circuitry configured to perform signal processing operations, wherein sanitizing the training data comprises: determining by the dedicated hardware unit that a training data entry has a signal to noise ratio below a threshold value indicating poor data quality; and removing the training data entry from the training data; train a machine-learning model using the sanitized training data; identify at least a decrease and at least a pattern of data, wherein: the at least a decrease includes, for each category of the at least one category of system data, a decrease in a second-order model, of the at least a second-order model, that is associated with the category, wherein identifying the decrease comprises: simulating, by the trained machine-learning model, the at least a current rate of growth by applying a comprehensive set of hypothetical inputs representative of potential actual environmental factors; comparing, by the trained machine-learning model, simulated outputs prior to any change in inputs with the simulated outputs subsequent to any change in inputs; generating, by the trained machine-learning model, a summary for a user; and the at least a pattern of data includes, for each category of the at least one category of system data, a pattern of data causally associated with the decrease in an associated second-order model of the plurality of second-order models; and configure a remote device to generate a display as a function of the decrease in each second-order model of the at least a second-order model and each pattern of data; wherein the machine-learning model further aggregates individual comparisons to associate inputs with positive or negative economic implications based on user feedback of actual environmental response; and the machine-learning model further recommends or deters the user from certain proposed actions based on learned associations.

2. The apparatus of claim 1, wherein receiving the plurality of system data comprises receiving the plurality of system data from a graphical user interface.

3. The apparatus of claim 1, wherein determining the at least a current rate of growth comprises determining the at least a current rate of growth for a plurality of user-defined categories.

4. The apparatus of claim 1, wherein generating the at least a second-order model of projected growth comprises determining a rate of change of the at least a current rate of growth with respect to economic implications.

5. The apparatus of claim 1, wherein identifying the at least a decrease in the at least a second-order model comprises: performing a real-time continual analysis on the at least a second-order model of projected growth; and identifying the at least a decrease in the at least a second-order model as a function of the real-time continual analysis.

6. The apparatus of claim 1, wherein identifying the at least a pattern of data comprises: quantifying a plurality of actual environmental factors, wherein each actual environmental factor of the plurality of actual environmental factors is associated to the at least a decrease in the at least a second order model; and identifying at least a dissociation protocol configured to dissociate the plurality of actual environmental factors from the at least a decrease in the at least a second order model.

7. The apparatus of claim 3, wherein each defined category of system data defined and included within the at least a current rate of growth will be amplified or reduced using a prioritization coefficient, wherein said prioritization comprises: identifying a relative importance between each defined category of system data; assigning a score as a function of the relative importance of each defined category of system data; incorporating the assigned prioritization score into the current rate of growth, wherein said incorporation would be accomplished by the user or a machine-learning model.

8. The apparatus of claim 1, wherein the at least a second-order model of projected growth comprises a third-order model of projected growth comprising a projected rate of growth of the current rate of growth.

9. The apparatus of claim 8, wherein the computing device is further configured to update the at least a second order model as a function of the third-order model of projected growth.

10. A method for high-order system growth modeling, wherein the method comprises: receiving, by a computing device, a plurality of system data describing a system; determining, by the computing device, at least a current rate of growth according to at least one category of the plurality of system data; generate, by the computing device, at least a second-order model of projected growth, wherein each second-order model of the at least a second-order model corresponds to a current rate of growth of the at least a current rate of growth; receiving, by the computing device, training data, wherein the training data comprises a plurality of data entries containing a plurality of environmental factor data correlated to a plurality of user summary data; sanitizing, by the computing device, the training data using a dedicated hardware unit comprising circuitry configured to perform signal processing operations, wherein sanitizing the training data comprises: determining by the dedicated hardware unit that a training data entry has a signal to noise ratio below a threshold value indicating poor data quality; and removing the training data entry from the training data; training, by the computing device, a machine-learning model using the sanitized training data; identifying, by the computing device, at least a decrease and at least a pattern of data, wherein: the at least a decrease includes, for each category of the at least one category of system data, a decrease in a second-order model, of the at least a second-order model, that is associated with the category, wherein identifying the decrease comprises: simulating, by the trained machine-learning model, the at least a current rate of growth by applying a comprehensive set of hypothetical inputs representative of potential actual environmental factors; comparing, by the trained machine-learning model, simulated outputs prior to any change in inputs with the simulated outputs subsequent to any change in inputs; generating, by the trained machine-learning model, a summary for a user; and the at least a pattern of data includes, for each category of the at least one category of system data, a pattern of data causally associated with the decrease in an associated second-order model of the plurality of second-order models; and configuring, by the computing device, a remote device to generate a display as a function of the decrease in each second-order model of the at least a second-order model and each pattern of data; wherein the machine-learning model is further configured to perform: an aggregation of individual comparisons to associate inputs with positive or negative economic implications; and a recommendation to either encourage or deter the user from certain proposed actions based on learned associations.

11. The method of claim 10, wherein receiving the plurality of system data by the computing device comprises receiving the plurality of system data from a graphical user interface.

12. The method of claim 10, wherein the determination of the at least a current rate of growth comprises determining, by the computing device, the at least a current rate of growth for a plurality of user-defined categories.

13. The method of claim 10, wherein the generation of the at least a second-order model of projected growth, by the computing device, comprising; the determination of a rate of change of the at least a current rate of growth with respect to economic implications.

14. The method of claim 10, wherein identification of the at least a decrease in the at least a second-order model comprises: performance, by the computing device, a real-time continual analysis on the at least a second-order model of projected growth; and identification, by the computing device, of the at least a decrease in the at least a second-order model as a function of the real-time continual analysis.

15. The method of claim 10, wherein identification, by the computing device, of the at least a pattern of data comprises: quantification, using the computing device, of a plurality of actual environmental factors, wherein each actual environmental factor of the plurality of actual environmental factors is associated to the at least a decrease in the at least a second-order model; and identification, using the computing device, of at least a dissociation protocol configured to dissociate the plurality of actual environmental factors from the at least a decrease in the at least a second-order model.

16. The method of claim 12, wherein each defined category of system data within the at least a current rate of growth will be amplified or reduced using a prioritization coefficient by the computing device, comprising: identification, using the computing device, of a relative importance between each defined category of system data; assignment, using the computing device, of a score as a function of the relative importance of each defined category of system data such that a category that is significantly more important than a separately defined category of system data, wherein a former score would be a 10 with a latter score a 1; and incorporation, using the computing device, of the assigned prioritization score into the current rate of growth.

17. The method of claim 10, wherein the generation, using the computing device, of at least a second-order model of projected growth comprises generating a third-order model of projected growth.

18. The method of claim 17, wherein the method further comprises updating the at least a second-order model as a function of the third-order model of projected growth.

* * * * *